United States Patent Office 3,467,505
Patented Sept. 16, 1969

3,467,505
PROCESS FOR PRODUCING LITHIUM ALUMINUM HYDRIDE
Waldemar Guex, Bottmingen, Reinhard Schlapfer and Hans Spiegelberg, Basel, Switzerland, assignors to Hoffmann-La Roche Inc., Nutley, N.J., a corporation of New Jersey
No Drawing. Filed June 27, 1960, Ser. No. 38,731
Claims priority, application Switzerland, July 8, 1959, 75,493/59
Int. Cl. C01b 6/24; C01d 11/02
U.S. Cl. 23—365   2 Claims

ABSTRACT OF THE DISCLOSURE

Lithium aluminum hydride is produced by reacting in the presence of an inert organic solvent, a lithium-aluminum alloy with elemental hydrogen under superatmospheric pressures and temperatures above about 100° C.

---

This invention relates to certain processes of preparing lithium aluminum hydride by hydrogenation under superatmospheric pressure. More particularly, the invention provides processes for the preparation of lithium aluminum hydride which comprise hydrogenating alloys containing lithium and aluminum under superatmospheric hydrogen pressures and at temperatures above about 80° C.

Alloys of lithium and aluminum suitable as starting materials are already known, and can be made readily and economically by melting the two metals together. For purposes of the present invention, it is particularly appropriate to use as starting material an alloy consisting essentially of lithium and aluminum in molar proportions of 1:1. Such an alloy, having essentially the empirical composition LiAl, is an intermetallic composition which is brittle and readily pulverized, and is stable in pulverized form if precautions are taken to exclude moisture.

It is advantageous to carry out the processes of the invention in the presence of an inert organic solvent in which the lithium aluminum hydride produced is soluble. Exemplary of such solvents are ether, methylal and especially tetrahydrofuran. The solvent is preferably employed in an amount at least sufficient to dissolve the lithium aluminum hydride produced, preferably in some excess over the amount required to dissolve the theoretical yield of lithium aluminum hydride. Upon effecting the reaction under these conditions, there are obtained solutions of lithium aluminum hydride in the particular solvent employed, which can be used directly for reduction reactions employing lithium aluminum hydride as the reducing agent, thus obviating the step of isolating solid lithium aluminum hydride from the reaction mixtures obtained according to the processes of the invention.

In one preferred embodiment, the invention provides a process for the preparation of lithium aluminum hydride which comprises reacting an alloy consisting essentially of lithium and aluminum in molar proportions of 1:1 with elemental hydrogen under hydrogen pressures between about 60 atmospheres gauge and about 100 atmospheres gauge and at temperatures between about 100° C. and about 130° C. Higher hydrogen pressures can be employed, if desired, but ordinarily are not advantageous because they necessitate special apparatus and operating conditions. It is advantageous to use the alloy in pulverized form, because the rate of hydrogenation and also the yield of hydrogenation product for a fixed reaction time depend upon the particle size of the alloy used as starting material. Thus, when employing an alloy in which the average particle size is less than about 10 microns, at temperatures between about 120° and about 130° C. and under hydrogen pressures of about 100 atmospheres gauge, 70 to 80% of the alloy reactant is hydrogenated within 24 hours.

According to another preferred teaching of the invention, the processes of the invention are carried out while simultaneously mechanically comminuting the alloy starting material. Thus, for example, the starting alloy can be provided in particles having a size predominantly in a range between about 40 microns and about 60 microns, and the hydrogenation can be effected in a rotating autoclave provided with steel balls or steel rollers or the like as comminuting elements. (An autoclave similar to that illustrated in Pryde U.S. Patent 2,715,057, issued Aug. 9, 1955, may be employed.) When carrying out the reduction processes of the invention simultaneously with a comminution procedure, it is recommended to maintain the reaction temperature below about 110° C. Below this temperature, the LiAl alloy is still sufficiently brittle to facilitate satisfactory comminution. At higher temperatures, e.g. at about 130° C., the ductility of the alloy is such that attempted comminution may result in agglomeration of the alloy particles.

The invention is further disclosed in the following examples, which are illustrative but not limitative thereof.

Example 1

40 g. of a lithium-aluminum alloy having essentially the empirical composition Li:Al, and having a particle size substantially entirely in the range between 5 microns and 10 microns, is placed in 600 ml. of anhydrous tetrahydrofuran and hydrogenated for 3 days in a shaking autoclave under a hydrogen pressure of 100 atmospheres gauge and at reaction temperatures between 120° and 130° C. At the end of this time the reaction mixture is centrifuged; there is thus obtained approximately 600 ml. of a cloudy, milky solution of lithium aluminum hydride in tetrahydrofuran, which contains 32 g. of lithium aluminum hydride as estimated by determination of active hydrogen. The thus obtained solution can be used directly as such, as a reducing agent, in lieu of solid lithium aluminum hydride. For example, ethyl benzoate and methyl linoleate are smoothly reduced to the corresponding alcohols by use of the solution as reducing agent.

Example 2

4 g. of lithium-aluminum alloy (molar proportion Li:Al=1:1) having a particle size substantially entirely in a range between 40 microns and 100 microns, is charged together with 100 ml. of anhydrous tetrahydrofuran to a rotating autoclave having a capacity of about 530 ml. and equipped with a steel roller, and is hydrogenated for three days at temperatures between 100° and 110° C., and under a hydrogen pressure of 100 atmospheres gauge. There is thus obtained a tetrahydrofuran solution of lithium aluminum hydride, which contains 1.8 g. of lithium aluminum hydride as estimated by determination of active hydrogen (40% yield).

We claim:
1. A process for the preparation of lithium aluminum hydride which comprises reacting in the presence of an inert organic solvent, an alloy consisting essentially of lithium and aluminum in molar proportions of 1:1 with elemental hydrogen under hydrogen pressures between about 60 atmospheres gauge and about 100 atmospheres gauge and at temperatures between about 100° C. and about 130° C.

2. A process according to claim 1 wherein the lithium-aluminum alloy is comminuted to an average particle size below about 10 microns.

References Cited

UNITED STATES PATENTS

| 1,958,012 | 5/1934 | Muckenfuss | 23—204 |
| 2,550,985 | 5/1951 | Finholt | 23—365 XR |
| 2,735,820 | 2/1956 | Steiger | 23—14 X |
| 2,900,402 | 8/1959 | Johnson | 260—448 |
| 2,920,935 | 1/1960 | Finholt | 23—14 |

FOREIGN PATENTS

| 1,235,680 | 5/1960 | France. |

OTHER REFERENCES

Barbor et al., "General College Chemistry," 1940, p. 66.

HERBERT T. CARTER, Primary Examiner